United States Patent [19]

Kang

[11] Patent Number: 5,155,428
[45] Date of Patent: Oct. 13, 1992

[54] OVERDISCHARGE AND OVERVOLTAGE PROTECTION CIRCUIT FOR A BATTERY IN A PORTABLE AND MOBILE COMMUNICATION SYSTEM

[75] Inventor: Seo-Won Kang, Suwon, Rep. of Korea

[73] Assignee: Samsung Electronics Co., Ltd., Suwon, Rep. of Korea

[21] Appl. No.: 635,984

[22] Filed: Dec. 31, 1990

[30] Foreign Application Priority Data

Jul. 19, 1990 [KR] Rep. of Korea ............... 1990-11007

[51] Int. Cl.⁵ ..................... H01M 10/46; H02J 7/00
[52] U.S. Cl. ............................. 320/13; 320/39; 320/48
[58] Field of Search ............... 320/13, 14, 39, 40, 320/48, 31, 32; 361/18, 58, 90, 91, 92; 307/10.7

[56] References Cited

U.S. PATENT DOCUMENTS

| | | |
|---|---|---|
| 3,740,569 | 6/1973 | Carcia ..................... 320/48 X |
| 3,800,198 | 3/1974 | Graf et al. . |
| 4,383,211 | 5/1983 | Staler ..................... 320/39 X |
| 4,583,035 | 4/1986 | Sloan ..................... 320/22 |
| 4,792,743 | 12/1988 | Tsujino et al. ............ 320/39 X |
| 4,820,965 | 4/1989 | Siemer .................... 320/31 |
| 4,929,931 | 5/1990 | McCuen ................... 320/48 X |
| 5,028,858 | 7/1991 | Schnizler et al. .......... 320/13 X |
| 5,073,837 | 12/1991 | Baek ...................... 320/13 X |

Primary Examiner—Steven L. Stephan
Assistant Examiner—Kristine Peckman
Attorney, Agent, or Firm—Robert E. Bushnell

[57] ABSTRACT

There is disclosed a circuit for protecting against overdischarge and overvoltage of a battery in a portable, mobile, and radio communication system including a low-power detection unit, a low-battery signal detection unit, a battery termination detection unit, a power supply controller, and a reference voltage converter.

20 Claims, 5 Drawing Sheets

OVERDISCHARGE AND OVERVOLTAGE PROTECTION CIRCUIT FOR A BATTERY IN A PORTABLE AND MOBILE COMMUNICATION SYSTEM

BACKGROUND OF THE INVENTION

The present invention relates to an overdischarge and overvoltage protection circuit for a battery in a portable, mobile radio communication system, more particularly to an overdischarge and overvoltage protection circuit which rings alarming sounds and disconnects power supply for battery (preferably Lead-Acid battery) protection when the battery overdischarges, or automatically disconnects a power supply when an overvoltage is supplied while using an exterior power supply.

In general, Ni-Cd and Lead-Acid batteries are used mostly for a main power supply of a mobile communication system. By the way, the Lead-Acid battery is more employed than the Ni-Cd battery since the Lead-Acid battery is cheaper than the Ni-Cd battery.

Figure 1:
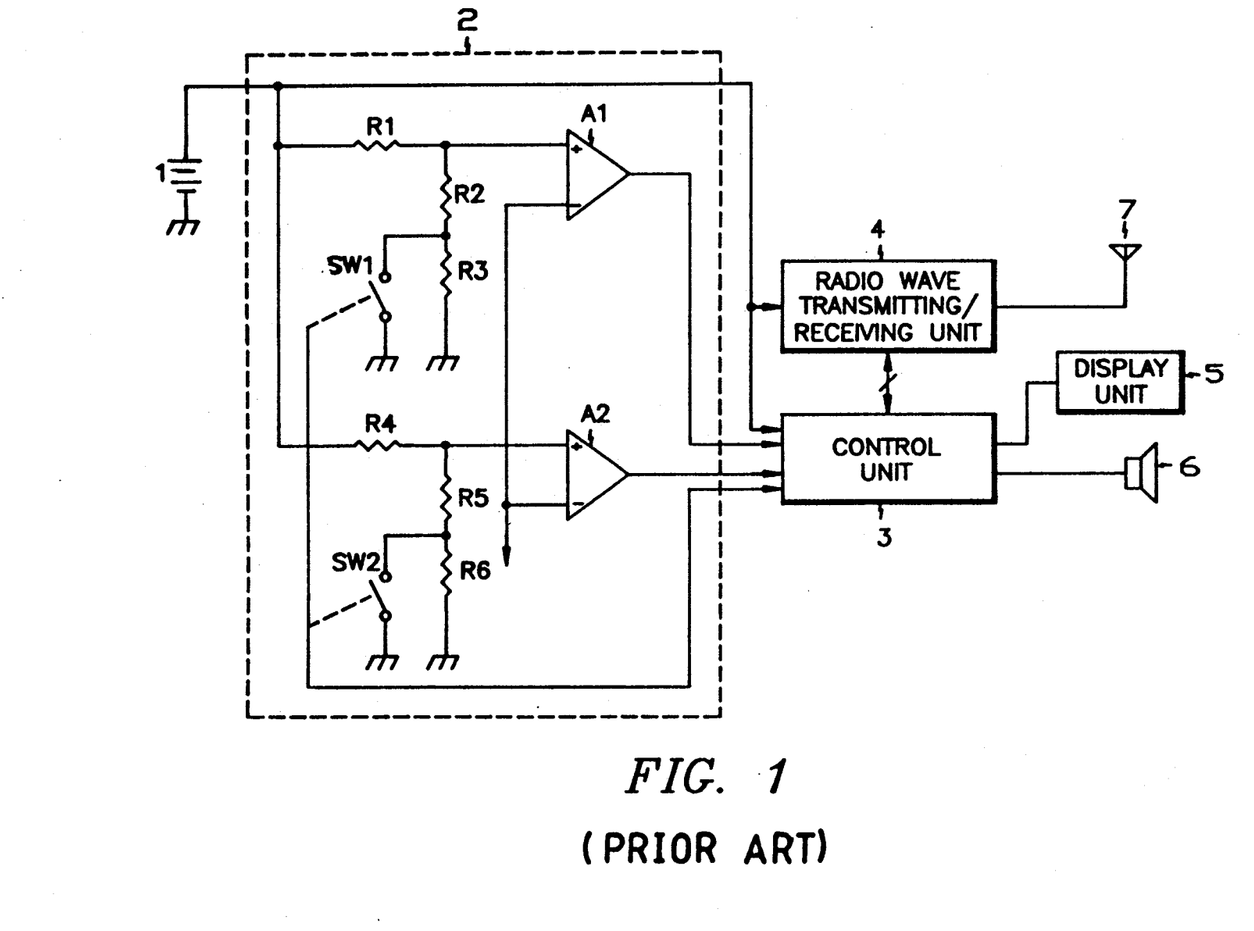
FIG. 1 is a conventional circuit.

FIG. 1 is a diagram of a conventional circuit, which consists of voltage comparators (A1) and (A2) of a battery protection (2) which detects a voltage-state and generates outputs to a control unit(3) when a voltage of a Lead-Acid battery is applied, and the control unit(3) which alarms and displays a warning signal through a speaker (6) and a display unit (6) respectively according to the detected voltage-state.

Figure 2:
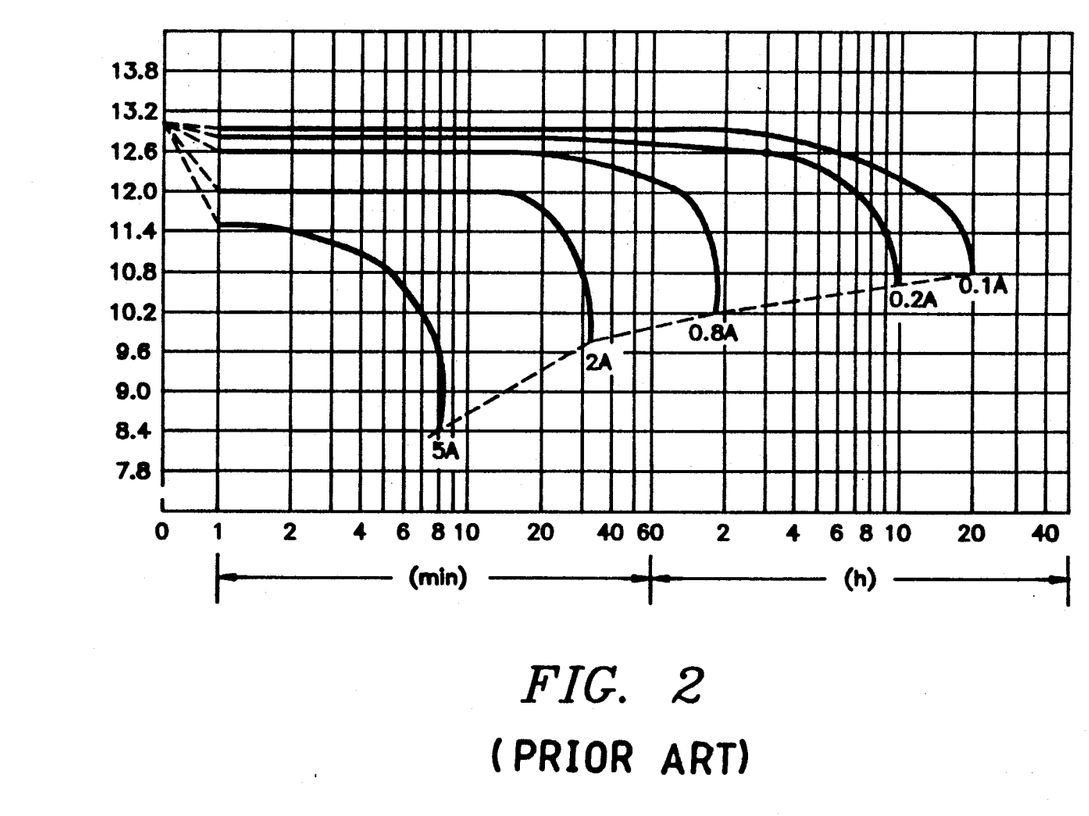
FIG. 2 is a diagram showing discharging characteristics of a battery.

FIG. 2 is a diagram showing discharging characteristics of the battery, and an operational aspect will now be described with reference to FIGS. 1 and 2. A voltage of the Lead-Acid battery (1) is applied to non-inverting input terminals (+) of the comparators (A1) and (A2). At this time, if the voltage of the Lead-Acid battery is lower than a reference voltage, a signal for a low-battery (hereinafter referred to as Low-Bat), which is a logic low state of voltage of the battery, is generated by the voltage comparator (A1) and applied to the control unit (3) in order to generate a warning signal for recharge even though it is possible to use as the present voltage. If a given voltage of the Lead-Acid battery which is applied to non-inverting input terminals (+) is lower than warning voltage, the voltage comparator (A2) generates a warning signal for a battery termination (hereinafter referred to as a Bat-Term), that is a logic low state which indicates the voltage of the Lead-Acid battery (1) reached out of an usable limit, thus cutting off the power supplying is necessary. This Bat-Term signal is applied to the control unit (3). When the Low-Bat signal from the voltage comparator (A1) is applied to the control unit (3), the control unit (3) generates alarming sounds and a warning sign which indicates a recharging is necessary since the voltage is low even though it is still usable through the speaker (6) and the display (5). However, if the Bat-Term signal from the voltage comparator (A2) is applied to the control unit (3), the control unit (3) generates alarming sounds and a warning sign, which indicates that the voltage of the Lead-Acid battery (1) has reached out of the usable limit and the main power supply has to be turned off, through the speaker (6) and the display unit (5) respectively. Also, in the mobile communication system, amounts of power consumption from the Lead-Acid battery (1) at a stand-by mode and a call mode are different. Especially, at the call mode, a transmitter "Tx" which sends out a radio carrier operates, thus more power is consumed than at the stand-by mode. Lead-Acid battery (1) must be able to supply different amounts of current for a warning level for Low-Bat and Bat-Term at the stand-by mode and for a warning level for Low-Bat and Bat-Term at the call mode according to the discharging characteristics diagram as in FIG. 2. To perform the above-mentioned operation, the control unit (3) shorts resistors "R3" and "R6" by switching on switches "SW1" and "SW2" at the stand-by mode to increase detection voltages of the voltage comparators (A1) and (A2). On the other hand, at the call mode, by switching off the switches "SW1" and "SW2", the detection voltages of the voltage comparators (A1) and (A2) become different.

The conventional circuit as shown in FIG. 1 has a drawback that there is no protection from overdischarge of the battery when a malfunction occurs due to a shock by an exterior power supply or a static electricity since it is not possible to operate a switch to disconnect the main power supply in the mobile communication system causing a short lifetime of a battery. The other drawback is that there is no protection from overvoltage when using an exterior power supply.

SUMMARY OF THE INVENTION

It is therefore an object of the present invention to provide a circuit which protects a Lead-Acid battery from an overdischarge state by alarming users by detecting an overdischarge state of a Lead-Acid battery in two stages and by disconnecting a power supply automatically when the power supply is not disconnected.

It is another object of the present invention to provide a circuit which protects a system from an overvoltage by automatically disconnecting a power supply when the overvoltage is supplied if an exterior power supply is used instead of an internal battery.

BRIEF DESCRIPTION OF THE DRAWINGS

For a better understanding of the invention and to show how the same may be carried into effect, reference will now be made, by way of example, to the accompanying diagrammatic drawings, in which.

DETAILED DESCRIPTION OF THE INVENTION

Figure 3:
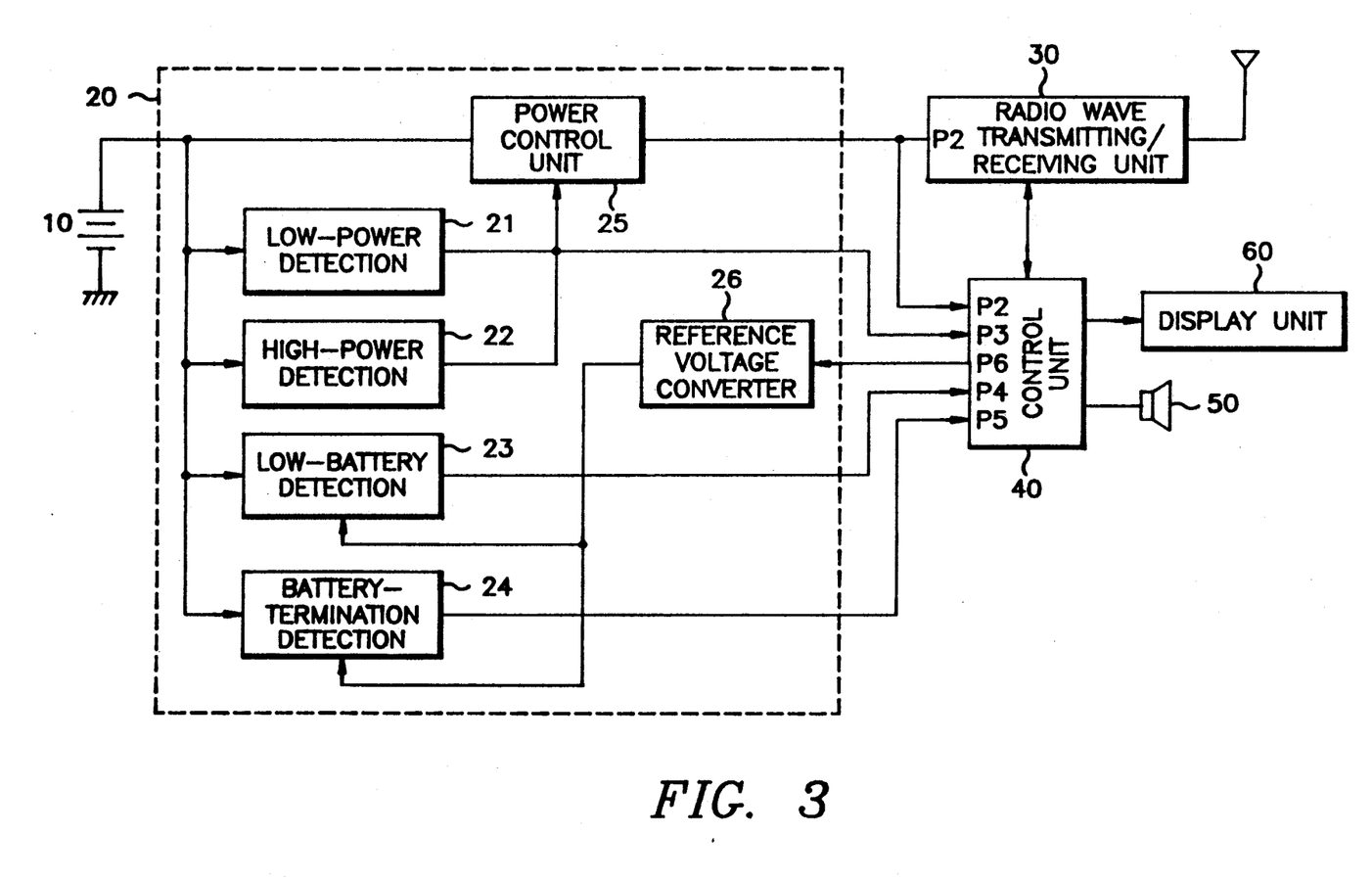
FIG. 3 is a system block diagram according to the invention.

Referring to FIG. 3, a Lead-Acid battery (10) supplies a power. A battery overdischarge and overvoltage protection (20) generates an overdischarge warning signal according to a power supply detection state when the Lead-Acid battery (10) is the power source and cuts off power if an overvoltage state is detected when using an exterior power supply. A control unit (40) controls a system. A radio transmitting and receiving unit (30) transmits and receives signals according to a controlling signal from the control unit (40).

The above-mentioned components, there is battery overdischarge and overvoltage protection unit (20) as described below. A low-power detection unit (21) generates a control signal for cutting off power when the Lead-Acid battery (10) is discharged to below a first given reference voltage (9 V). A high-power detection unit (22) generates a controlling signal for cutting off when an overvoltage above a given reference voltage (17 V) is detected when an exterior power supply is used. A low-battery signal detection unit (23) generates a warning signal for recharge when voltage of Lead-Acid battery is below a first established reference warning voltage. A battery termination detection unit (24) generates a signal to disconnect the power supply when a voltage of the applied Lead-Acid battery is below an second established reference voltage of 9 V. A power control unit (25) disconnects the power supply according to controlling signals from the low-power detection unit (21), the high-power detection unit (22), and the control unit (40). A reference voltage converting unit (26) controls voltages through the low-battery signal detection unit (23) and the battery termination detection unit (24) by taking the controlling signal which distinguishes a stand-by and a call modes from the control unit (40) as an input.

Figure 4:
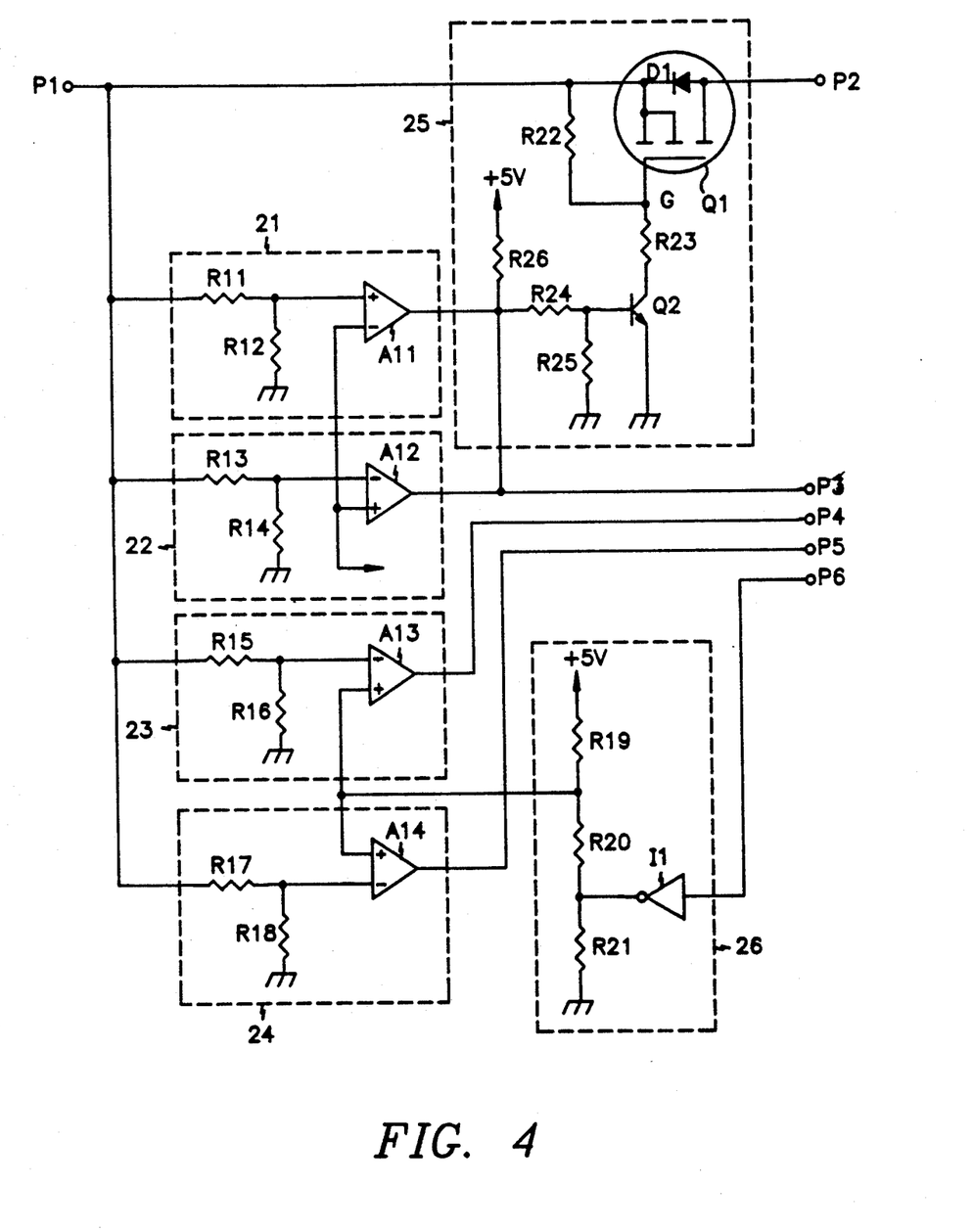
FIG. 4 is an embodiment of a circuit of an overdischarge and overvoltage protection (20)

Referring to FIG. 4, between input terminals of a battery power supply (P1) and a system power supply (P2), a MOSFET "Q1" whose source and drain are connected by a diode (D1) is connected, and a resistor "R22" is connected between a source and a gate of the MOSFET "Q1". Between the gate of the MOSFET "Q1" and a collector of a transistor "Q2", a resistor "R23" is connected, and an emitter of the transistor "Q2" is grounded. A resistor "R25" is connected between a base of the transistor "Q2" and the ground, and a resistor "R24" is connected between the base of the transistor "Q2" and a resistor "R25" which connects to a 5 V power supply. A resistor "R11" is connected between the battery "P1" and a non-inverting input terminal (+) of a first voltage comparator (A11). A resistor "R12" is connected between the ground and the non-inverting input terminal (+) of the first voltage comparator (A11). To an inverting input terminal (−) of the first voltage comparator (A11), a reference voltage (5 V) is applied. An output terminal of the first voltage comparator (A11) is connected to a node which connects to the resistor "R24" and the resistor "R26". A resistor "R13" is connected between the input terminal of the battery power supply "P1" and an inverting input terminal (−) of a second voltage comparator (A12). A resistor "R14" is connected between the ground and the inverting input terminal (−) of the second voltage comparator (A12). To a non-inverting input (+) terminal of the second voltage comparator (A12), a reference voltage (5 V) is applied. An output terminal of the second voltage comparator (A12) is connected to the node which connects to the resistor "R24" and the resistor "R26". The node which connects to the resistor "R24" and the resistor "R26" is also connected to a power control unit (P3) of the control unit (40). A resistor "R15" is connected between the input terminal of the battery power supply "P1" and an inverting input terminal (−) of a third voltage comparator (A13). A resistor "R16" is connected between the ground and the inverting input terminal (−) of the third voltage comparator (A13), and an output from the third voltage comparator (A13) is connected to an input terminal "P4" of a low-battery signal. A resistor "R17" is connected between the input terminal of the battery power supply "P1" and an inverting input terminal (−) of a fourth voltage comparator (A14). Between the inverting terminal (−) of the fourth voltage comparator (A14) and the ground, a resistor "R18" is connected, and an output from the fourth voltage comparator (A14) is connected to an input terminal "P5" of a battery termination signal. Between an input voltage "Vcc" of a power supply and the ground, resistors "R19" through "R21" are connected in series, and to a node which connects the resistors "R19" and "R20", non-inverting input terminals (+) of the third and the fourth voltage comparators are connected. An input terminal of an inverter (I1) is connected to an input terminal of a call/stand-by mode control unit (P6), and an output terminal of the inverter (I1) is connected to a node which connects to the resistors "R20" and "R21". From the above stated components, a low-power detection unit (21) which consists of the resistors "R11" and "R12", and the first voltage comparator (A11) corresponds to the low-power detection unit (21) in FIG. 3. A high-power detection unit (22) which consists of the resistors "R13" and "R14" and the second voltage comparator (A12) corresponds to the high-power detection unit (22) in FIG. 3. A low-battery detection unit (23) which consists of the resistors "R15" and "R16" and the third voltage comparator (A13) corresponds to the low-battery detection (23) in FIG. 3. A battery termination detection unit (24) which consists of resistors "R17" and "R18" and the fourth voltage comparator (A14) corresponds to the battery termination detection unit (24) in FIG. 3. A power control unit (25) which consists of the resistors "R22" through "R26", the MOSFET "Q1", and the transistor "Q2" corresponds to the power control unit (25) in FIG. 3. A reference voltage converting unit (26) which consists of the resistors "R19" through "R21" and the inverter (I1) corresponds to the reference voltage converting unit (26) in FIG. 3.

According to the above stated structure, an implementation of the invention will be described with references to FIGS. 3 and 4. First, when the exterior power supply is used instead of the Lead-Acid battery (10), due to a malfunction of the power supply, if the overvoltage which is above the established reference voltage (17 V), is applied to the inverting terminal (−) the second voltage comparator (A12) through the input terminal of the battery power supply (P1), the second voltage comparator (A12) generates a logic low signal as an output. Since the second voltage comparator (A12) has an open collector configuration, when the logic low signal from the second voltage comparator (A12) is applied to the base of the transistor "Q2", the transistor "Q2" turns itself off. When the transistor "Q2" is off, a logic high signal is applied to the gate of the MOSFET "Q1", and the MOSFET "Q1" turns itself off resulting in the disconnection of the exterior power supply through the input terminal of battery power supply (P1). At this time, a voltage of power from the exterior power supply which is applied through the input terminal of the battery power supply (P1) is divided by the resistors "R13" and "R14". If the voltage divided by the resistors "R13" and "R14" is called as $V_{BH}$, then $V_{BH} = (R13+R14)*5 \text{ V}/R14$. Here, the reference voltage is 17 Volts. When a voltage higher than the reference voltage (17 V) is applied to the inverting terminal (−) of the second voltage comparator (A12), the second voltage comparator (A12) recognizes above station as the overvoltage, thus outputs a logic low signal. However, when a voltage lower than the reference voltage is applied to the inverting input terminal (−) of the second voltage comparator (A12), the second voltage comparator outputs a logic high signal. If a logic high signal is generated by the second voltage comparator (A12), the power supply (5 V) applies a logic high signal to the base of the transistor "Q2" through the pull-up resistor "R26" and the resistor "R24" causing the resistor "Q2" to be on. If the transistor "Q2" turns on, the exterior power supply which applies through the input terminal of the battery power supply (P1) flows through the resistors "R22" and "R23". Because of this, a logic low signal is applied to the gate of the MOSFET "Q1" turning the MOSFET "Q1" on. If the MOSFET "Q1" is turned on, the exterior power which applies through the input terminal of the battery power supply "P1" applies to input terminal "P2" of the system power supply.

On the other hand, when the Lead-Acid battery (10) is used as a power supply, the power which is applied through the input terminal of the battery power supply "P1" is applied to the non-inverting input terminal (+) of the first voltage comparator (A11), and supplying power (5 V) is applied to the inverting input terminal (−) of the first voltage comparator (A11). Here, if the voltage which is divided by the resistors "R11" and "R12" is called $V_{BL}$, then $V_{BL}$ is $(R11+R12)*5$ Volts/R12. The reference voltage is 9 Volts.

When a voltage lower than the reference voltage (9 V) is applied to the non-inverting input terminal (+) of the first voltage comparator (A11), the first voltage comparator (A11) estimates the voltage as a cut-off voltage, thus generates a logic low signal. However, a voltage higher than the reference voltage (9 V) is applied to the non-inverting input terminal (+) of the first voltage comparator (A11), the first voltage comparator (A11) generates a logic high signal. When the first voltage comparator (A11) generates a logic high signal, the supplying power of (5 V) applies to the base of the transistor "Q2" through the resistors "R26" and "R24", therefore the transistor "Q2" is turned on. When the transistor "Q2" turns on, the exterior power supply which applies through the input terminal (P1) of the battery power supply is applied through the resistors "R22" and "R23". Also, a logic low signal is applied to the gate of the MOSFET "Q1", turning on the MOSFET "Q1". Here, a voltage between the source and the gate of the MOSFET "Q1" is called $V_{GS}$, then $V_{GS}$ is $-\{R22/(R22+R23)*V_B\}$, where $V_B$ is a voltage of the battery. When the MOSFET "Q1" turns on, the power supplied by the Lead-Acid battery (10) applies to the supplying power input terminal (P2) of the system, therefore the power is applied to the radio transmitting and receiving unit (30) and the control unit (40).

Referring to FIGS. 3 and 4, the reference voltage converting unit (26) generates different reference voltages for the stand-by mode and the call mode by taking a control signal from the control unit (40) (as shown FIG. 3) which distinguishes the call mode from the stand-by mode. During the call mode, a logic high signal which is generated from the call/stand-by mode control unit (P6) of the control unit (40) as shown FIG. 3, is inverted to the logic low signal by the inverter (I1). Since the inverter I1 has an open drain configuration, when the output is a logic low signal, the voltage $V_R$ generated through the line "A" becomes $\{R20/(R19+R20)\}*5$ V. However, during the stand-by mode, a logic low signal which is generated from the call/stand-by mode control unit (P6) of the control unit (40), is inverted to the logic high signal by the inverter (I1). Since the inverter (I1) has an open drain configuration, when the output is a logic high signal, the voltage $V_R$ generated through the line "A" is $\{(R20+R21)/(R19+R20+R21)\}*5$ V. Therefore, the reference voltages for warning from the low-battery detection unit (23) and the battery termination detection unit (24) during the call mode and the stand-by mode are different, and have four different values as below;

$V_L\text{-Bat(stby)} = (R15+R16) * V_R(\text{stby})/R16$ $V_L\text{-Bat(call)} = (R15+R16) * V_R(\text{call})/R16$ $V_B\text{-Trm(stby)} = (R17+R18) * V_R(\text{stby})/R18$ $V_B\text{-Trm(call)} = (R17+R18) * V_R(\text{call})/R18$ where $V_L$-Bat(stby) is the reference voltage for warning from the low-battery detection unit (23) during the stand-by mode, $V_L$-Bat(call) is the reference voltage for warning from the low-battery detection unit (23) during the call mode, $V_B$-Trm(stby) is the reference voltage for warning from the battery termination detection unit (24) during the stand-by mode, and $V_B$-Trm(call is the reference voltage for warning from the battery termination detection unit (24) during the call mode.

However, since a twelve volt Panasonic LCS2012APC Lead-Acid battery is used in this embodiment, the reference voltages for warning become as below.

| | |
|---|---|
| $V_L$-Bat(stby) = 11.5 V, | $V_L$-Bat(call) = 10.45 V, |
| $V_B$-Trm(stby) = 10.65 V, and | $V_B$-Trm(call) = 9.7 V. |

Therefore, a voltage divided by the resistors "R15" and "R16" which applies through the input terminal (P1) of the battery power supply applies the inverting input terminal (−) of the third voltage comparator (A13). Here, if the voltage which applies the inverting input terminal (−) of the third voltage comparator (A13) is lower than the reference voltage for warning (11.5 V for the stand-by mode and 10.45 V for the call mode) which applies the non-inverting input terminal(+) of the third voltage comparator (A13), the third voltage comparator (A13) generates a logic high signal. The logic high signal from the third voltage comparator (A13) is applied to the input terminal (P4) of the low battery signal in the control unit (40), and a warning sound and a warning sign which indicate that a recharging of the Lead-Acid battery (10) is necessary, are generated through the speaker (50) and the display unit (60) by a software process from the control unit (40). If the recharging of the Lead-Acid battery (10) is not performed after the warning sound and the warning sign from the speaker (50) and the display unit (60) are generated, a voltage which applies through the input terminal (P1) of the battery power supply is divided by the resistors "R15" and "R16" and then is applied to the inverting input terminal of the third voltage comparator (A13). Here, if the voltage which generates the inverting input terminal (−) of the fourth voltage comparator (A14) is lower than the reference voltage for warning (10.65 V for the stand-by mode and 9.7 V for the call mode) which applies the non-inverting input terminal (+) of the fourth voltage comparator (A14), the fourth voltage comparator (A14) generates a logic high signal. The logic high signal from the fourth voltage comparator (A14) is applied to the input terminal (P4) for the low-battery signal in the control unit (40), and a warning sound and a warning sign which indicate that a disconnection of the power supply from the Lead-Acid battery (10) are generated through the speaker (50) and the display unit (60) by a software process from the control unit (40). If the power supply of the Lead-Acid battery (10) is not turned off, even an established period (about 30 seconds) is passed after the warning sound and the warning sign from the speaker (50) and the display unit (60) are generated to notify an user, then a logic low signal is generated through the power supply control unit (P3) by the control unit (40). This turns off the power supply control unit (P3) resulting in a disconnection of the power supply of the Lead-Acid battery (10).

Figure 5:
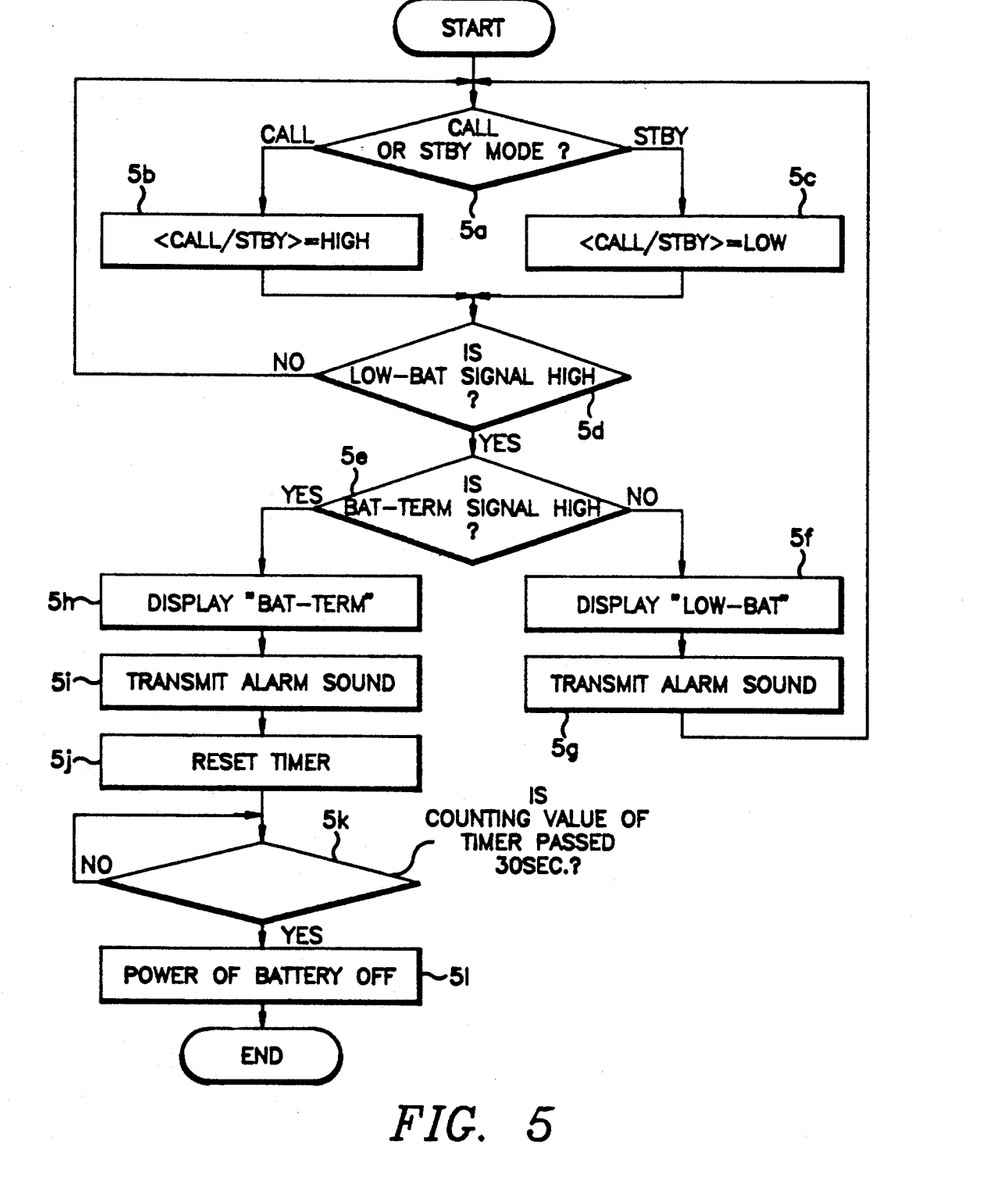
FIG. 5 is a flow diagram according to the invention.

Referring to FIG. 5, the composition of the invention is as follows. A first process determines the call mode or the stand-by mode. A second process generates the warning sound and the warning sign by detecting the low-battery warning signal which requires recharging of the battery after the call mode or the stand-by mode is decided by the first process. A third process generates a warning sound and a warning sign by detecting the battery termination warning signal after the warning sound and the warning sign are generated as in the second process. A fourth process turns the battery power off an establish time later by resetting a timer after generating the warning sound and the warning sign as in the third process., According to the above-mentioned composition, an embodiment of the present invention with a reference to FIG. 5. is as follows. In step 5A, the mode of the system is checked by either the call mode or the stand-by mode. If the mode is the call mode, in step 5B, a call and stand-by mode control unit (P6) of the control unit (40) generates a logic high signal, and if the mode is the stand-by mode, in step 5C a call/stand-by mode control unit (P6) of the control unit (40) generates a logic low signal. Also, in step 5D, the low-battery signal is checked whether the signal is a logic high signal or not. If the signal is not a logic high signal, step 5A is repeated, and if the signal is a logic high signal, step 5E is performed. In the step 5E, the battery termination signal is checked whether the signal is a logic high signal or not. If the signal is not a logic high signal, step 5F is performed, and if the signal is a logic high signal, step 5H is performed. In step 5F, the low-battery warning sign is indicated by the display unit (60), and then step 5G is performed.

In the step 5G, the warning sound is generated through the speaker (50), and then the step 5A is repeated. In step 5H, the battery termination warning sign is indicated by the display unit (60), and then step 5I is performed. In step 5I, the warning sound is generated through the speaker (50), and in the step 5J, the timer is reset, and then step 5K is performed. In the step 5K, the timer is checked whether the timer passes 30 seconds, and if the timer passes 30 seconds, step 5L is performed. In step 5L, a logic low signal is sent to the power supply control unit (P3) of the control unit (40) to turn the power of the battery off.

As stated above, this invention is advantageous in such ways as protecting the battery from an overdischarge state by alarming users by detecting an overdischarge state of the battery in two stages and by disconnecting a power supply automatically when the power supply is not disconnected, and protecting a system from an overvoltage by disconnecting a power supply automatically when the overvoltage is supplied if an exterior power supply is used instead of an inside battery.

What is claimed is:

1. A battery overdischarge protection circuit having a battery means, a radio transmitting and receiving means, a controller means, a speaker means, and a display means, said circuit comprises:

low-power detection means for generating a low-power signal to disconnect a power supply generated by said battery means when a voltage of said battery means falls below a first reference voltage;

low-battery detection means for generating a warning signal indicative of said power supply being deficient when said voltage of said battery means falls below a second reference voltage;

battery termination detection means for generating a battery terminated signal to disconnect said power supply when said voltage of said battery means falls below a third reference voltage;

power supply controller means for disconnecting said power supply of said battery means in response to said low-power signal generated from said low-power detection means; and reference voltage converter means for providing said second and third reference voltages for said low-battery detection means and said battery termination detection means in dependence upon selection of one of a stand-by mode and a call mode by said controller means.

2. A battery overdischarge protection circuit as claimed in claim 1, wherein said low-power detection means comprises:

an input terminal coupled to said power supply of said battery means for providing said power supply;

comparator means for comparing said power supply of said battery means to said first reference voltage to provide said low power signal, said comparator means having a non-inverting terminal coupled to receive said power supply of said battery means, and an inverting terminal coupled to receive said first reference voltage;

first resistor interposed between said input terminal and said non-inverting terminal of said comparator means for regulating said power supply of said battery means to said comparator means; and second resistor interposed between said non-inverting terminal of said comparator means and ground for regulating said power supply of said battery means.

3. A battery overdischarge protection circuit as claimed in claim 1, wherein said power supply controller means comprises:

a transistor for enabling transmission of said low-power signal, said transistor having a base coupled to receive said low-power signal and an emitter connected to ground;

a MOSFET for supplying an external power source in dependence upon reception of said low-power signal, said MOSFET having a diode connected between a source and a drain of said MOSFET said drain being coupled to said external power source; and a plurality of resistors for regulating said transmission of said low-power signal and said external power source, said plurality of resistors having a first resistor interposed between said source and a gate of said MOSFET, a second resistor interposed between said gate of said MOSFET and a collector of said transistor, a third resistor interposed between said base of said transistor and ground, and fourth and fifth resistors interposed between said base of said transistor and a five volt power supply.

4. A battery overdischarge protection circuit as claimed in claim 1, wherein said reference voltage converter means comprises:
an inverter means for inverting a mode signal indicative of one of a stand-by mode and a call mode generated from said controller means; and
resistor means for generating a variable voltage according to the output of said inverter means.

5. A battery overdischarge protection circuit as claimed in claim 4, wherein said inverter means has an open drain configuration.

6. A battery overdischarge protection circuit as claimed in claim 4, wherein said variable voltage is used to generate one of said second and third reference voltages for said low-battery detection means and said battery termination detection means, respectively.

7. A battery overdischarge protection circuit as claimed in claim 4, wherein said resistor means comprises a plurality of resistors connecting in series between a five volt power supply and ground.

8. A battery discharge protection circuit as claimed in claim 1, further comprising:
high power detection means for generating a high-power signal to disconnect an external power supply of an external power source when said external power supply is higher than a fourth reference voltage, whereby said external power supply is supplied when said low-power detection means disconnects said power supply generated by said battery means.

9. A battery overdischarge protection circuit as claimed in claim 1, wherein said battery means is one of a lead-acid battery and a nickel-cadmium battery.

10. A battery overdischarge protection circuit as claimed in claim 8, wherein said fourth reference voltage is seventeen volts.

11. An overdischarge and overvoltage protection circuit for a battery of an electrical system, said circuit comprising:
low-power detector means coupled to receive battery power voltage of said battery, said low-power detector means comparing said battery power voltage with a first reference voltage to provide a low-power signal;
power controller means for disconnecting said battery power voltage of said battery to replace said battery power voltage with an external power voltage in response to said low-power signal;
low-battery detector means coupled to receive said battery power voltage of said battery, said low-battery detector means comparing said battery power voltage with a second reference voltage to provide a low-battery signal when said battery power voltage is lower than said second reference voltage;
battery-termination detector means coupled to receive said battery power voltage of said battery, said battery-termination means comparing said battery power voltage with a third reference voltage to provide a battery terminated signal when said battery power voltage is lower than said third reference voltage; and
reference voltage converter means for supplying said second and third reference voltages to said low-battery detector means and said battery-termination detector means, respectively said second and third reference voltages having voltage values depending upon selection of one of a stand-by mode and a call mode, with each voltage value of said second reference voltage being higher than each corresponding voltage value of said third reference voltage.

12. The overdischarge and overvoltage protection circuit as claimed in claim 11, further comprising:
high-power detector means coupled to receive said external power voltage of said external power source, said high-power detector means comparing said external power voltage with a fourth reference voltage to provide a high-power signal; and
said power controller means disconnecting said external power voltage of said external power source in response to said high-power signal.

13. The overdischarge and overvoltage protection circuit as claimed in claim 12, wherein said power controller means comprises:
a transistor for enabling and disabling transmission of one of said low-power signal and said high-power signal in dependence upon reception of said low-power signal and high-power signal, said transistor having a base coupled to receive said low-power signal and said high-power signal and emitter connected to ground;
a MOSFET for enabling transmission of said external power voltage of said external power source into said electrical system in response to said low-power signal whereby said low-power signal is an ON signal indicative of said battery power voltage being lower than said first reference voltage, and for disabling transmission of said external power voltage from said electrical system in response to said high-power signal whereby said high-power signal is an ON signal indicative of said external power voltage being higher than said fourth reference voltage, said MOSFET having a diode interposed between a source and a drain of said MOSFET, and said drain being coupled to receive said external power source; and
a plurality of resistors for regulating said transistor and said MOSFET, said plurality of resistors having a first resistor interposed between said source and a gate of said MOSFET, a second resistor interposed between said gate of said MOSFET and a collector of said resistor, a third resistor interposed between said base of said transistor and a reference potential, a fourth resistor coupled to receive said low-power and high-power signals and connected to said base of said transistor, and a fifth resistor coupled to receive said low-power and high-power signals and connected to a five volt power supply, whereby said five volt power supply serves as a basic voltage for determining said first and fourth reference voltages.

14. The overdischarge and overvoltage protection circuit as claimed in claim 12, wherein said reference voltage converter means comprises:
an inverter for receiving a command signal representative of one of said stand-by mode and said call mode to provide an inverted signal in dependence upon said command signal, said inverter having an open-drain configuration; and
a plurality of resistors connected in series and connectable to a five volt power supply for regulating power voltages for said second reference voltage and said third reference voltage in dependence upon said inverted signal representative of one of said stand-by mode and said call mode, whereby said stand-by mode is indicative of said electrical system being inoperative and said call mode is indicative of said electrical system being operative.

15. The overdischarge and overvoltage protection circuit as claimed in claim 14, wherein during said stand-by mode said second reference voltage is 11.5 volts and said third reference voltage is 10.65 volts, and wherein during said call-mode, said second reference voltage is 10.45 volts and said third reference voltage is 9.7 volts.

16. The overdischarge and overvoltage protection circuit as claimed in claim 11, wherein said battery is one of a lead-acid battery and a nickel-cadmium battery.

17. The overdischarge and overvoltage protection circuit as claimed in claim 13, wherein said low-power detector means comprises:
   an input terminal for providing said battery power voltage;
   a comparator means for comparing said battery power voltage to said first reference voltage to generate said low-power signal when said battery power voltage is lower than said first reference voltage, said comparator means having a non-inverting terminal for receiving said battery power voltage and an inverting terminal for receiving said first reference voltage; and
   a plurality of resistors for establishing a voltage value of said first reference voltage by voltage dividing said five volt power supply from said power controller means with respect to each resistor value of said plurality of resistors, said plurality of resistors having a first resistor interposed between said input terminal and said non-inverting terminal and a second resistor interposed between said first resistor and ground.

18. The overdischarge and overvoltage protection circuit as claimed in claim 13, wherein said high-power detector means comprises:
   an input terminal coupled to receive one of said battery power voltage and said external power voltage;
   a comparator for comparing one of said battery power voltage and said external power voltage to said fourth reference voltage to generate said high-power signal when said external power voltage is higher than said fourth reference voltage, said comparator having an inverting terminal for receiving said external power voltage and a non-inverting terminal for receiving said fourth reference voltage; and
   a plurality of resistors for establishing a voltage value of said fourth reference voltage by voltage dividing said five volt power supply from said power controller means with respect to each resistor value of said plurality of resistors, said plurality of resistors having a first resistor interposed between said input terminal and said inverting terminal and a second resistor interposed between said first resistor and said reference potential.

19. The overdischarge and overvoltage protection circuit as claimed in claim 14, wherein said low-battery signal provides a first alarm sound through a speaker and a first display signal through a visual display for a first time period, and said battery terminated signal provides a second alarm sound through said speaker and a second display signal through said visual display for a second time period, and enables a termination of said battery power voltage from said electrical system after said second time period.

20. The overdischarge and overvoltage protection circuit as claimed in claim 19, wherein said power controller means terminates said battery power voltage by the steps of:
   determining whether said inverted signal represents one of said stand-by mode and said call mode;
   determining whether said low-battery signal is provided,
   displaying said first display signal and generating said first alarm sound representative of said low-battery signal for said first time period if said low-battery signal is provided;
   determining whether said battery terminal signal is provided;
   displaying said second display signal and generating said second alarm sound representative of said battery terminated signal for said second time period if said battery terminated signal is provided; and
   disconnecting said battery power voltage in response to said battery terminated signal after said second time period.

* * * * *

UNITED STATES PATENT AND TRADEMARK OFFICE
CERTIFICATE OF CORRECTION

Page 1 of 2

PATENT NO. : 5,155,428
DATED : 13 October 1992
INVENTOR(S) : Seo-Won Kang

It is certified that error appears in the above-indentified patent and that said Letters Patent is hereby corrected as shown below:

IN THE ABSTRACT

On title page, item [57], after "protecting", change "against" to --an--;

| | | |
|---|---|---|
| Column 2, | line 66, | before "above-mentioned", change "The" to --In the --, and before "battery", insert --a formation of the--; |
| | line 67, | after "protection unit (20)" insert --formed--; |
| | line 68, | before period, change "described belows" to --follows--; |
| Column 5, | line 18, | after "which", change "is applied" to --applies--; |

UNITED STATES PATENT AND TRADEMARK OFFICE
CERTIFICATE OF CORRECTION

PATENT NO. : 5,155,428
DATED : 13 October 1992
INVENTOR(S) : Seo-Won Kang

It is certified that error appears in the above-indentified patent and that said Letters Patent is hereby corrected as shown below:

Column 8, line 61, after "MOSFET", insert comma -- , --;

Column 9, line 62, before "means", insert --detector--:

Signed and Sealed this

Fifteenth Day of October, 1996

Attest:

BRUCE LEHMAN

Attesting Officer    Commissioner of Patents and Trademarks